C. F. CANDLER.
PNEUMATIC BRAKE FOR AUTOMOBILES.
APPLICATION FILED DEC. 13, 1915.
1,213,457.
Patented Jan. 23, 1917.
2 SHEETS—SHEET 1.
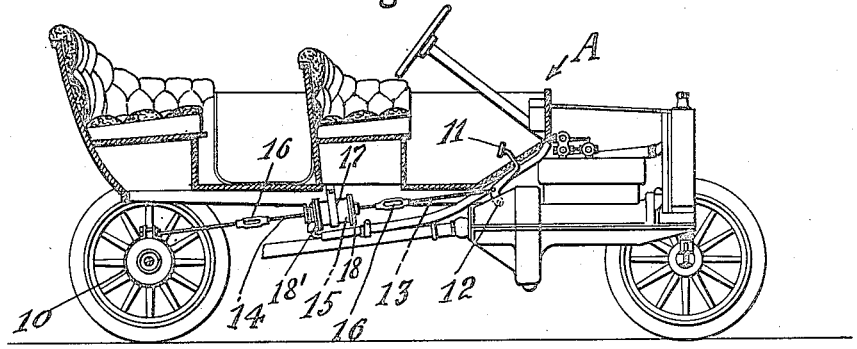
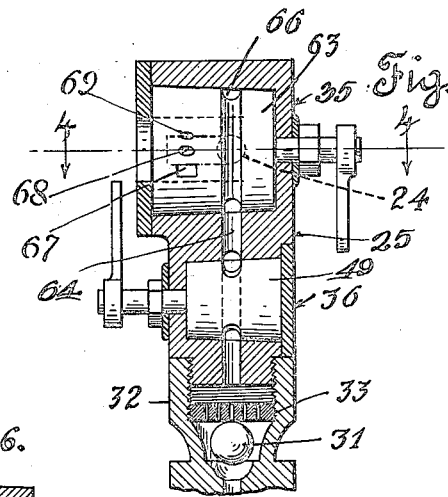
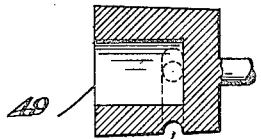
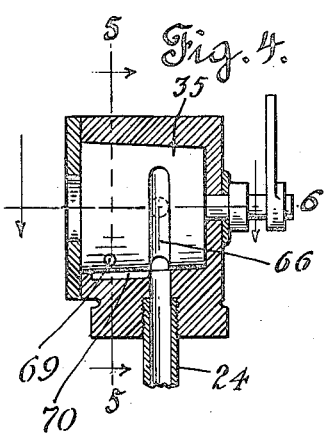
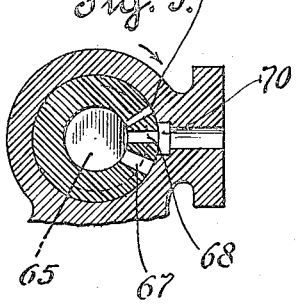
Inventor
Conway F. Candler,
by Hazard Berry & Miller
his Attorneys.

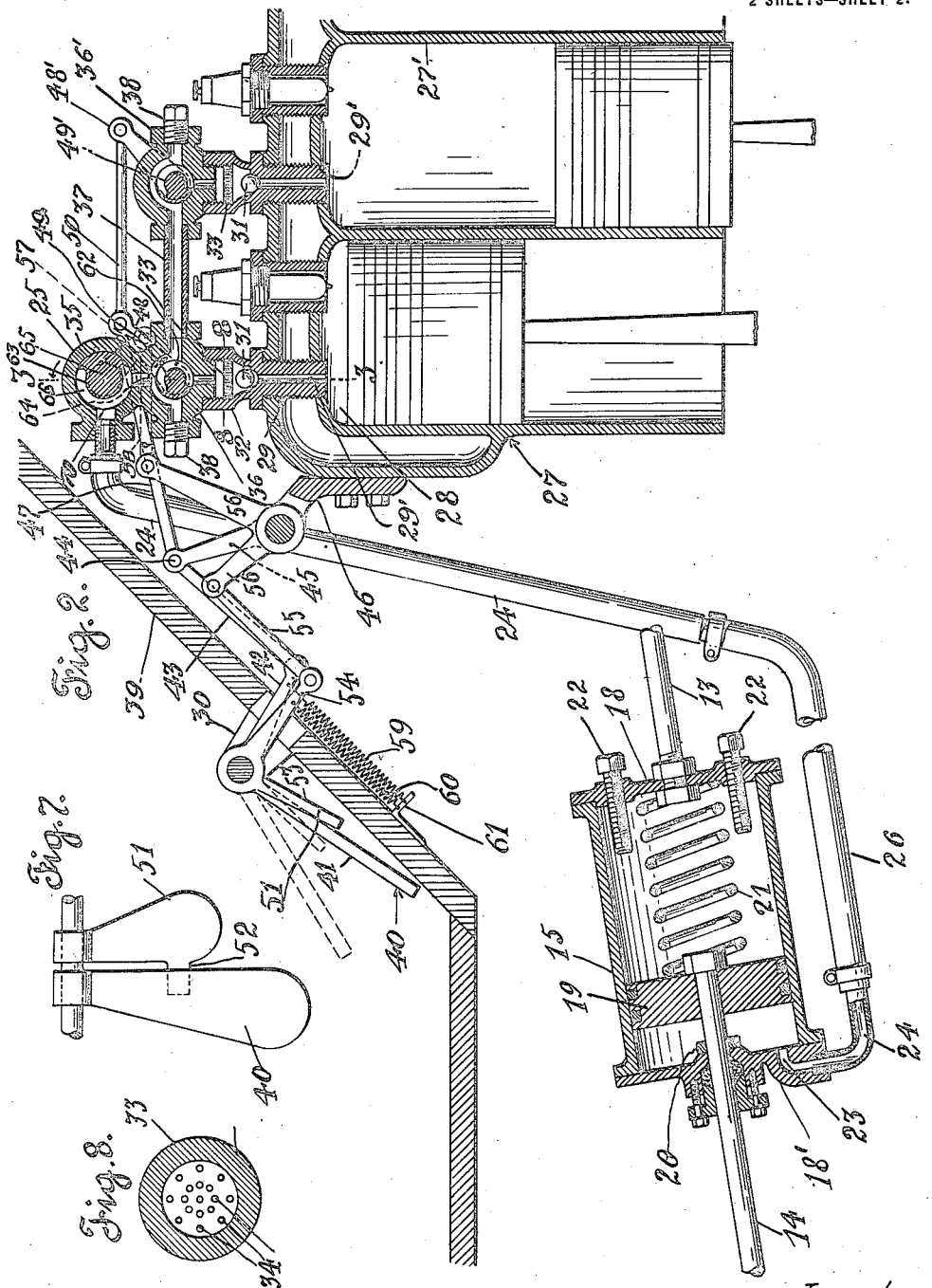

UNITED STATES PATENT OFFICE.

CONWAY F. CANDLER, OF ORANGE, CALIFORNIA.

PNEUMATIC BRAKE FOR AUTOMOBILES.

1,213,457.  Specification of Letters Patent.  Patented Jan. 23, 1917.

Application filed December 13, 1915. Serial No. 66,625.

*To all whom it may concern:*

Be it known that I, CONWAY F. CANDLER, a citizen of the United States, residing at Orange, in the county of Orange and State of California, have invented new and useful Improvements in Pneumatic Brakes for Automobiles, of which the following is a specification.

My invention relates to improvements in brakes for automobiles and in particular to an auxiliary pneumatic brake attachment which is operatively connected to the ordinary foot brake.

It is an object of this invention to construct a brake for motor driven vehicles such as automobiles, which may be manually operated as an ordinary footbrake, or which may be operated by means of fluid pressure from the explosion chamber of the cylinders of the internal combustion engine of the automobile.

It is another object of this invention to provide a pneumatic cylinder operating a piston which is connected to the brake operating rod, said cylinder being inserted in the rod leading from the footbrake pedal to the brake. Means are provided for admitting and controlling the pressure from the explosion chamber of the engine cylinder to the pneumatic brake cylinder, said means being under the control of the operator of the car, whereby he may instantly, by a slight pressure of the foot, operate the pneumatic brake cylinder, and accurately control the force applied to the brake. The pneumatic brake attachment is so constructed that it will not interfere with the normal operation of the footbrake if for any reason the operator should desire to use said brake, or if the pneumatic brake attachment should get out of order.

With these and other objects in view which will appear as the description proceeds, my invention consists in the novel features of construction, combination and arrangements of parts hereinafter described and claimed.

In the accompanying drawings which form a part of this specification, I have illustrated a convenient and practical embodiment of my invention, and in which:

Figure 1 is a vertical longitudinal section of an automobile equipped with my pneumatic brake attachment to the footbrake. Fig. 2 is a diagrammatic view, partly in section, of the pneumatic brake attachment. Fig. 3 is an enlarged sectional view on line 3—3, Fig. 2, showing the construction of the throttle and the control valves mounted on the internal combustion cylinder. Fig. 4 is a horizontal section of the controlling valve on line 4—4, Fig. 3. Fig. 5 is a vertical cross-section on line 5—5 Fig. 4. Fig. 6 is a sectional view of the control valve on line 6—6, Fig. 4. Fig. 7 is a detail view showing the valve controlling pedals. Fig. 8 is an enlarged detail sectional view taken on line 8—8, Fig. 2.

A designates an automobile having a rear axle provided with a brake 10 of any suitable construction. The same is operated by a footbrake pedal 11, pivoted at 12 to any suitable part of the machine, and a brake rod which consists of a front section 13 and a rear section 14 between which a pneumatic brake cylinder 15 is inserted. The length of the brake rod sections may be adjusted by means of turn buckles 16, 16, as will be understood.

17 designates a U-shaped cylinder supporting member suitably secured to the body of the car, said member passing under and encircling the cylinder and allowing slidable longitudinal movement of the latter in relation to said supporting member.

18 and 18' designate respectively the heads of the pneumatic brake cylinder 15. The rear end of the front section 13 of the brake rod is rigidly secured to the head 18. The front end of the rear section 14 of the brake rod is slidably mounted in the cylinder head 18', and is rigidly secured to the cylinder piston 19.

20 is a piston seat or stop secured on the inner face of the cylinder head 18'. A coiled compression spring 21 mounted in the piston chamber between the piston and the head 18, tends to force the piston toward the head 18', and against the stop 20.

22, 22 are a pair of adjustable stop members mounted in the cylinder head 18 which project into the piston chamber and which are adapted to limit the forward movement of the piston 19. The head 18' is provided with a cylinder inlet port 23 which is connected to a conduit 24, which leads to a compound valve casing 25.

26 is a flexible conduit such as rubber hose, which is inserted in the conduit 24, and which allows longitudinal movement of the pneumatic brake cylinder in relation to the supporting member 17.

27 designates an internal combustion engine of any suitable type, having a combustion chamber 28, which is connected by means of a tubular bushing 29, provided at its upper end with a downwardly closing check valve 31. An enlarged tubular connection 32 formed integral with said bushing is connected to the valve casing 25. A perforated anti-backfiring plate 33 is securely mounted in said tubular connection 32 and serves to effectively prevent the explosion in the ignition chamber of the engine cylinder from igniting any combustible gases which may be in the valve casing 25. The anti-backfiring plate 33 is so proportioned that the sum of the area of the perforations 34 therein is equal to the cross-sectional area of the duct 291 in the bushing 29.

The valve casing 25 consists of an upper control valve 35 and a lower throttle valve 36. A tubular connection 37 establishes communication between the valve member 36 and a valve member 36' mounted on a tubular bushing 29 of an adjacent cylinder 27'. If desired, one or more of the remaining cylinders of the internal combustion engine may be similarly connected to the throttle valve casing member 36.

38, 38, designates screw plugs, at the outer ends of the throttle valve casings 36 and 36'.

Pivoted to a support 30 on the dash board 39 of the automobile is a throttle valve operating pedal 40 which is in the form of a bell crank lever, consisting of an upper arm 41 and a lower arm 42, the latter being pivotally connected to a link 43 which is pivoted at 44 to the upper end of a rocking arm 45 which is pivoted to a bracket 46 fast to the upper end of the cylinder 27. Leading from the upper end of the arm 45 is a link 47 whose outer end is pivoted to a throttle valve operating arm 48 fast to the throttle valve 49 which is mounted on the cylinder 27. The valve operating arm 48' of the throttle valve 49' is connected to the arm 48 by a link 50, so that the operation of valves 48 and 48' will be in unison. Located by the side of the throttle valve operating pedal 40 is a control valve operating pedal 51 having a lug 52 laterally extending therefrom slightly below the pedal 40. The pedal 51 is so positioned that it will not be engaged by pedal 40 until the latter has been depressed a short distance.

The pedal 51 is in the form of a bell crank lever having arms 53 and 54, the latter being pivotally connected by means of a link 55 to a bell crank lever 56 which is pivoted to bracket 46. The lever 56 is connected to the control valve operating arm 57 by a link 58.

59 and 60 are coiled tension springs secured at one end to a small bracket 61, secured to the under side of the dash board 39 of the automobile. The other ends of the springs are secured to the arms 42 and 54, of the pedals 40 and 53. The springs 59 and 60 tend to move the pedals into normal inoperative position.

The throttle valve member 49 mounted in the valve casing 36 has the shape of a frustum of a cone, provided on its periphery with a semi-circular groove or channel 62. As shown in Fig. 2, said groove 62 extends around its periphery for approximately two-thirds of the distance. Rotation of said valve will establish communication between the explosion chamber of the cylinders and the control valve 63, which is connected with the valve 49 by a duct 64. The control valve member 63 in the valve casing 35 has the shape of a frustum of a cone, and is provided with a central cylindrical bore 65 which serves as an outlet or exhaust port. A semi-circular groove or channel 66 on the periphery of the valve 63 and extending for approximately two-thirds of the distance is adapted to establish communication between the duct 64 and the conduit 24 leading to the pneumatic brake cylinder 15.

67 is an exhaust duct in the valve 63, leading from the periphery thereof to the exhaust port 65. Adjacent thereto is a smaller exhaust port 68 and adjacent thereto is a still smaller exhaust duct 69. These exhaust ducts are in alinement and are adapted to establish communication between the exhaust port 65 and the channel 66 of the valve 63 by means of a longitudinal groove 70 on the inner face of the control valve casing 35. The groove 70 extends from the channel 66 to a point beyond the outer end of the largest exhaust port 67. When the pneumatic brake attachment is in its inoperative position, the largest duct 67 registers with the groove 70. When any one of the exhaust ducts 67, 68 or 69 registers with the groove 70, it will also be in communication with channel 66 of the valve 63, as clearly shown in Fig. 4.

On depressing the pedal 40, the throttle valve 49 will be rotated in the direction shown by the arrow in Fig. 2, establishing communication between the explosion chamber of the engine and the connection duct 64 leading to the throttle valve casing 35. On the further depression of the pedal 40, the control valve operating pedal 51 will be operated, thereby turning the control valve 63 in the direction shown by the arrow, thereby establishing communication between the connection duct 64 and the groove 62 in said valve. The large exhaust duct 67 in said valve will be turned out of registry with the groove 70 of the valve casing 35, and the medium sized exhaust port 68 will now register with said groove 70. On further rotation of the valve, the small exhaust duct 69 will be in registry with said groove, and on a further rotation of the valve, communication with the exhaust port 65 will be entirely cut off, allowing the pressure to pass from said valve into the conduit 24 into the pneumatic cylinder, moving the piston 17 against the tension of the spring 21.

Operation: The footbrake may be operated independently of the pneumatic brake attachment. By depressing the footbrake pedal 11 the front section 13 of the brake rod is moved forward, moving the pneumatic cylinder with it, which is capable of longitudinal movement on its support 17, the flexible conduit 26 allowing such movement. The piston 19 being seated against the piston seat 20 and the rear section 14 of the brake rod will move forwardly in unison with the front section 13, thereby operating the brake.

If it is desired to operate the pneumatic brake attachment, the throttle valve pedal 40 is depressed, which will operate the throttle valve 49, thereby establishing communication between the explosion chamber of the engine and the controlling valve casing 35. Simultaneously with the operation of the throttle valve 49, the throttle valve 49′ of the adjacent cylinder 27′ will be operated in like manner, allowing the pressure from the explosion chamber of the cylinder 27′ to pass through the connecting pipe 37 to the throttle valve casing 36, and thence to the control valve casing 35. While I have shown two cylinders arranged in series for conducting pressure from the explosion chambers thereof, it will be obvious that the remaining cylinders of the car may likewise be utilized for furnishing pressure by equipping each one with the attachment shown in connection with cylinder 27′. I have found however, that two cylinders will furnish sufficient power to effectively operate the pneumatic brake attachment. On the further depression of the pedal 40, the controlling valve pedal 51 is picked up, which operates the control valve 63, establishing communication between the explosion chamber of the engines and the piston chamber of the pneumatic cylinder. During the first part of the operation of said valve 63, the intermediate exhaust duct 68 will be in communication with the exhaust port and the explosion chamber as explained above. The pressure applied to the piston 19 in the cylinder will consequently be diminished because of the partial escape of the pressure through the intermediate exhaust duct. On further rotation of said valve the small exhaust duct 69 will be in communication with the exhaust port. In this position of the valve, the pressure behind the piston 19 will be correspondingly increased. On still further rotation of the valve 63, the full pressure of the explosion chambers of the engines will be available to force the piston 19 against the tension of the spring 21. As soon as the foot pressure is released from the pedals 40 and 51, the springs 59 and 60 will move said pedals to their normal inoperative position, causing the throttle valves 49 and 49′ to close, and establishing communication with the exhaust port 65 of the control valve 63 by means of the large exhaust duct 67. The pressure in the piston chamber of the pneumatic cylinder will escape through said exhaust, which will be facilitated by the action of the spring 21, moving piston 19 against its seat 20. It should be noted that the forward movement of the piston will move the rear section 14 of the brake rod forwardly, thereby actuating the brake. The pneumatic cylinder, although free to move, will remain stationary when the gas pressure enters the piston chamber, for the reason that action is equal to reaction, and the pressure on the cylinder head 18′ is equal to the pressure on the piston 19. The footbrake pedal resting on its stop on the footboard, the brake rods are prevented from moving in any except a forward direction. Consequently the piston 19 will move forward and actuate the rear of the brake rod, thus applying the brake.

While I have shown pedals for operating the pneumatic brake, it is obvious that manually operated means suitably positioned within the driver's reach on the steering column may be substituted therefor.

It should be noted that the pressure is communicated to the pneumatic cylinder from the explosion chamber of the engines both on the compression stroke as well as on the explosion stroke of the engine. The anti-backfiring disk 33 prevents the ignition of the gaseous mixture beyond said disk.

While I have shown the preferred mode of construction of the pneumatic attachment for the brake of an automobile, it will be understood that various changes in the construction, arrangement and combination of parts may be made by those skilled in the art without departing from the spirit of my invention as defined in the appended claims.

I claim:

1. The combination of an automobile, an internal combustion engine, a footbrake comprising a pedal and a brake rod, said rod consisting of a front and a rear section, a pneumatic cylinder having its front head rigidly attached to said front section, a piston slidably mounted in said cylinder and operatively connected to said rear section, resilient means tending to move said piston into brake release position, adjustable piston stops limiting the movement of said piston, a pressure conduit leading from said cylinder to the combustion chamber of said engine, said conduit comprising a flexible section, a throttle valve in said conduit, a control valve provided with an exhaust port, said control valve being provided with a plurality of exhaust passages of successively increasing cross-sectional area, adapted to establish communication between said conduit and said exhaust port and valve operating means under the control of the operator.

2. The combination of an automobile, an internal combustion engine, a footbrake comprising a pedal and a brake rod, said rod consisting of a front and a rear section, a pneumatic cylinder having its front head rigidly attached to said front section, a piston slidably mounted in said cylinder and operatively connected to said rear section, resilient means tending to move said piston into brake release position, a support for said cylinder allowing longitudinal movement thereof, a pressure conduit leading from said cylinder to the combustion chamber of said engine, a throttle valve in said conduit, a control valve located in said conduit between said throttle valve and said cylinder, said control valve being provided with an exhaust port and a plurality of exhaust passages of successively increasing cross sectional area adapted to establish communication between said conduit and said exhaust port, valve operating means under the control of the operator and resilient means for moving said valves into brake inoperative position.

3. The combination of an automobile, an internal combustion engine, a footbrake comprising a pedal and a brake rod, said rod consisting of a front and a rear section, a pneumatic cylinder having its front head rigidly attached to said front section, a piston slidably mounted in said cylinder and operatively connected to said rear section, a pressure conduit leading from said cylinder to the combustion chamber of said engine, a control valve in said conduit, said control valve being provided with an exhaust port and an exhaust passage establishing communication between said conduit and said exhaust port when the brake is in release position, and valve operating means under the control of the operator for establishing communication between the combustion chamber of said engine and said pneumatic cylinder.

4. The combination of an automobile, an internal combustion engine, a brake, a brake rod, a pneumatic cylinder, a piston slidably mounted therein and operatively connected to said rod, resilient means tending to move said piston into brake release position, adjustable stops limiting the movement of said piston, a pressure conduit leading from said cylinder to the combustion chamber of said engine, a throttle valve in said conduit, a control valve between said throttle valve and said cylinder in said conduit, said control valve being provided with an exhaust port and a plurality of exhaust passages of successively increasing cross-sectional area adapted to establish communication between said conduit and said exhaust port, and valve operating means under the control of the operator.

5. The combination of an automobile, an internal combustion engine, a brake, a brake rod, a pneumatic cylinder, a piston slidably mounted therein and operatively connected to said rod, a pressure conduit leading directly from said cylinder to the combustion chamber of said engine, a throttle valve in said conduit normally closing communication between said cylinder and said conduit, a control valve between said throttle valve and said cylinder in said conduit, said control valve being provided with an exhaust port and an exhaust passage adapted to establish communication between said conduit and said exhaust port, and valve operating means under the control of the operator.

6. The combination of an automobile, an internal combustion engine, a brake, a brake rod, a pneumatic cylinder, a piston slidably mounted therein and operatively connected to said rod, a pressure conduit leading directly from said cylinder to the combustion chamber of said engine, a control valve in said conduit, said control valve being provided with an exhaust port and an exhaust passage establishing communication between said conduit and said exhaust port when said brake is in release position, and valve operating means under the control of the operator.

In testimony whereof I have signed my name to this specification.

CONWAY F. CANDLER.